Feb. 3, 1953 H. W. WOLF 2,627,224
METHOD OF AND APPARATUS FOR BILLING
AND INVENTORYING STOCK
Filed Dec. 1, 1948 6 Sheets-Sheet 1

INVENTOR.
HANLEY W. WOLF
BY
Burton & Parker
ATTORNEYS

Patented Feb. 3, 1953

2,627,224

UNITED STATES PATENT OFFICE 2,627,224

METHOD OF AND APPARATUS FOR BILLING AND INVENTORYING STOCK

Hanley W. Wolf, Detroit, Mich.

Application December 1, 1948, Serial No. 62,948

19 Claims. (Cl. 101—93)

This invention relates to a method of and apparatus for printing and particularly to a billing machine and inventory recorder and method of utilizing the same.

Heretofore, highly complicated and relatively expensive machines using punch cards have been employed for billing purposes which required a number of skilled operators and large files of numbered cards. Such machines and the accompanying card files occupied a large amount of valuable office space and because of the necessary conversation between card pullers for operating the system it usually has been the practice to locate the billing area away from other personnel in order to reduce noise and obtain comparative quiet. Punch cards representative of each item in stock were required and separate files of these cards representing items of stock-on-hand and items disposed of or sold were provided. In the majority of cases when a multiple of an item was ordered, it was necessary for a card puller to withdraw a number of cards corresponding in number to the quantity of the item ordered. Since more than one of such operators were working at the same time, the chance for error was quite large. When a stock became depleted to a point that was predetermined as a buying level, a warning of this was given by colored tabs on the cards or other suitable indicating means, requiring card pullers to interrupt their operations to relay this information to the buyer or other person designated to maintain the stock at the required level.

It has been suggested that the punched card type of billing machine be used to provide a perpetual inventory of stock-on-hand. Since each item of stock sold is represented by the card that is removed from the files at the time the sale is made, the perpetual inventory was represented at all times by those cards of all items that were still on hand in the file. For an inventory check, a physical count of all the cards in the stock-on-hand files must be made and compared against master cards bearing information as to quantity of any incoming merchandise. Accordingly, it was the usual practice to set aside certain times for making inventory checks and the actual amount of stock-on-hand was only available immediately following such checks.

An important object of this invention is to provide an improved method and apparatus for printing, registering and recording a multiplicity of different items and particularly for invoicing and inventorying stock of merchandise which is rapid and accurate in operation, requires relatively inexpensive equipment and only one operator. Another important object of the invention is to provide a novel method of and an apparatus for printing invoices and simultaneously automatically indicating a current or running inventory, which method and apparatus enables the invoicing to be performed at one place and the inventory record to be displayed or shown at one or more places remote from the invoicing operating area. A further important object of the invention is to provide an improved machine for billing orders which eliminates the use of punched cards and large card files heretofore employed for this purpose and the necessity of providing trained personnel for sorting and pulling the cards.

In the general application of the invention there is provided a printing machine having one or more continuously rotating printing cylinders or drums each containing removable type for printing different impressions. A surface to be printed is successively fed to a position adjacent to the periphery of the cylinder or the selected cylinder of a plurality of such printing cylinders and is caused to be moved in a novel manner to engage the selected cylinder and to receive the printing impression of a single line of type on the cylinder. In accomplishing this operation in accordance with the preferred form of the invention, the printing surface is momentarily brought into contact with the cylinder and held in printing engagement therewith without interrupting the drive means for imparting rotation to the cylinder, and thereafter the printing surface is retracted from the cylinder. Novel means is provided for shifting the printing surface to present the next blank area thereof prior to the next printing operation and for canceling or obliterating a printed line if an error has been made. Associated with the printing machine is a novel control mechanism for selecting the particular line of type on the cylinder for printing the same on the surface fed thereto, which mechanism is simple in operation and is capable of being used by untrained personnel.

In the specific application of the invention to merchandising, there is provided a system comprising the novel combination of a billing machine and a displayed inventory register which function simultaneously together and maintain a constant running inventory of all stock-on-hand at any instant. The billing machine and the inventory register are so operatively associated that they may be separated remotely from one another and perform their respective operations in separate offices of a business establishment. An important feature of the invention relates to the provision of means for making permanent records of the running inventory at set intervals of time whereby from such recordings a study of the comparative scale of different items over relatively long periods of time can be quickly and conveniently made.

Important novel features of the billing machine relate to the control exercised thereover whereby one line of type of hundreds on a particular printing drum is selected and caused to be printed on a blank invoice. In addition to printing items in stock on the invoices, the billing machine is adapted at the same time to print the quantity of any item ordered. Moreover, the billing machine in one printing operation is also capable of printing on the invoice the name and address of the customer making the purchase and date thereof. The manner of exercising control over the billing machine is simple and requires no trained or skilled personnel. A selecting instrument is operatively associated, preferably by novel electrical means, with the billing machine which requires the simple operation of manually actuating control elements or buttons for selecting the desired item to be printed and automatically controlling the machine to print the desired item without further manual supervision thereof. Associated with the billing machine are special numbering wheels for indicating the quantity of the item purchased. These wheels are controlled from the selecting instrument and are arranged to print the quantity of an item ordered simultaneously with the printing of the item.

A machine constructed in accordance with this invention may be relatively small and comprise a single printing cylinder or may be large and comprise a multiple set of printing cylinders. In the latter construction, a series of continuously rotating printing drums are coaxially mounted and driven at the same rate of speed and shiftable for engagement with any cylinder is a platen carrying the surface medium upon which the printing takes place. Novel features of such a multiple cylinder machine include means for providing bodily translational movement of the platen and printing surface parallel to the series of cylinders and means for controlling such movement to dispose the platen in printing relation to any selected cylinder. Other novel features of this form of the invention relate to the means for providing movement of the platen and printing surface in the direction of rotational movement of the selected cylinder and the means for bringing the platen and printing surface into printing engagement with the cylinder during such movement.

Various other objects, advantages and meritorious features of the invention will become more fully apparent from the following specification, appended claims, and accompanying drawings wherein:

Fig. 7 is a front elevation of one of the mechanisms in the inventory register for indicating stock on hand and quantity disposed of, Fig. 8 is a side view of the mechanism of Fig. 7 taken along line 8—8 thereof and indicating the position of the mechanism to the front panel of the inventory register.

General organization

Figure 1:
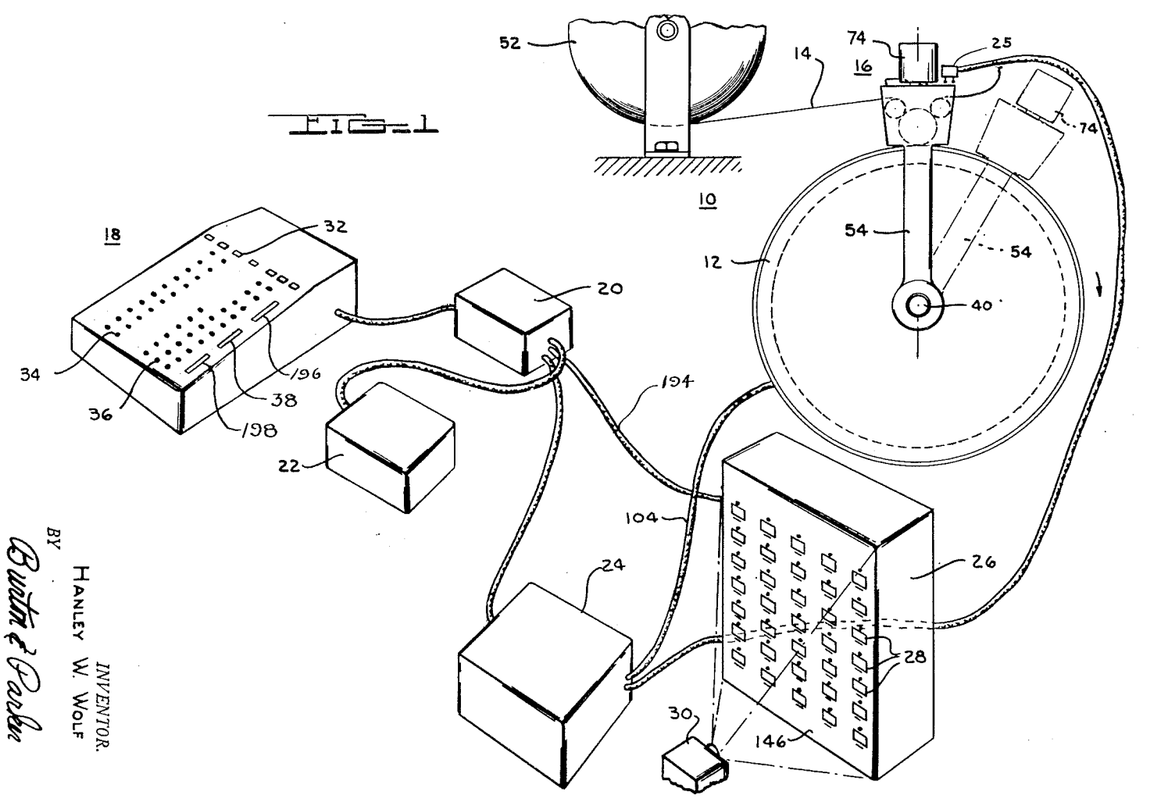
Fig. 1 is a schematic view, partly in perspective, illustrating the application of the invention to a combination billing machine and an inventory register.

The invention is illustrated herein as applied to a billing machine with which is associated an inventory register, but it is understood that the invention is applicable to other uses. Fig. 1 is a schematic view of an apparatus embodying the invention and applied to the invoicing of merchandise and to the displaying of a running inventory of stock on hand. In this figure there is shown an invoice printing mechanism generally indicated at 10 including a rotatable printing cylinder 12, a web of paper or the like 14 upon which printing impressions are made, and a mechanism generally indicated at 16 for bringing the paper web into momentary contact with a selected portion of the periphery of the cylinder. Associated with the printing mechanism are control mechanisms including a manual selecting instrument generally indicated at 18 and electrical devices as the holding relay circuit box 20, the electronic pulse generator 22, the electronic pulse counter control unit 24, and the switch control box 25 for controlling the printing mechanism.

Also associated with the apparatus is an inventory register generally indicated at 26 having a plurality of windows 28 through which the quantites of items in stock are displayed. For the schematic showing, the number of windows in the inventory register are much less than would normally be provided and it is understood that a register of this character may have many hundreds or thousands of such windows depending upon the magnitude of the business establishment in which the apparatus is used. Associated with the inventory register 26 is a device for permanently recording the displayed quantities of items in stock at periodic intervals of time. The device is represented in the illustrated embodiment of the invention as a camera 30 disposed in front of the register and positioned to make a permanent photographic record of the figures of the different items appearing in the windows 28. The camera may be operated once daily, for example, either manually by an employee or automatically by a time clock, and reproduced on micro-film for convenient storage and use at a later time.

The invention is adapted to an apparatus containing a single printing cylinder 12 or to a larger apparatus having a multiple set of printing cylinders. Since the features of a single cylinder printing apparatus are carried over and embodied in a multiple cylinder form of the invention, the single cylinder type is first described. As will be more particularly described hereinafter, the periphery of the printing cylinder 12 carries a plurality of lines of type arranged parallel to the axis of the cylinder and circularly spaced thereabout. Each line of type is different from the others, and in the application of the invention to the invoicing of merchandise each line may represent a different item in stock and also the names and addresses of regular customers and the date. Although separate invoice blanks could be fed to the printing of cylinder, it is preferred to provide the paper web 14 upon which a connected series of blank invoices are printed and have them successively fed to the printing cylinder. A feature of the invention is the provision of means for simultaneously printing the quantity of an item ordered at the same time the item is printed on the invoice, the quantity figure appearing on the same line as the item and preferably on the left side thereof as a conventional practice.

The selecting instrument 18 is provided with a plurality of manually actuable elements preferably in the form of depressible buttons. These buttons are arranged in separate groups according to their function. The buttons of the top row 32 may represent in the example of Fig. 1 the different printing cylinders of a multiple cylinder apparatus and depression of one of these buttons will cause the web to be shifted into position opposite the selected cylinder preparatory to receiving a printed impression therefrom. For a single cylinder form of apparatus this row of buttons may be omitted. The buttons of the left column 34 may represent the quantity of an item ordered and depression of one or two of these buttons will cause the printing machine to print a number on the invoice blank. The right column of buttons 36 represents the code numbers of all the different items in stock and the names and addresses of the customers and depression of any one of these buttons will cause the printing of the selected item or customer on the invoice blank. It is understood that the selector unit 18 shown in Fig. 1 is merely illustrative of the unit and that it may contain a variable number of control buttons depending on the size of the business establishment.

The electrical devices 20, 22 and 24 operatively couple the selector unit 18 with the printing mechanism 10 and with the inventory register 26. The electronic devices are schematically shown in Fig. 1 as connected to one another and the other units of the apparatus by sheathed electric cables which it is understood contain a multiplicity of electric wires for effecting the control over the different parts of the apparatus. Upon selection and depression of one or more buttons in the quantity column 34 and the selection and depression of a button in the item column 36 of the selector unit 18, the electrical devices will upon actuation of a trip bar 38 print the quantity and item selected on the blank invoice and simultaneously therewith cause the quantity figure of the selected item displayed by the register 26 to be changed. Thus as each item and its quantity is invoiced an instant change of the quantity on hand of the item appears on the register. The register 26 thus provides a current or running inventory of all stock and by virtue of its electrical connection to the remaining parts of the apparatus may be located at a place remote from the invoicing operating area. In large establishments, two or more inventory registers may be provided located in separate offices remote from the invoicing area, or the register could be divided into sections located in separate offices of buyers concerned with the items displayed.

*Single cylinder printing machine*

Figure 2:
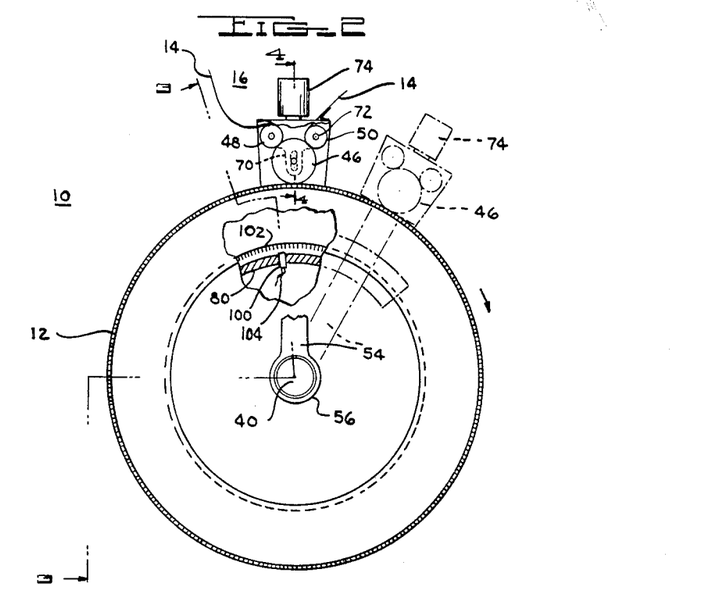
Fig. 2 is a side elevation, partly broken away in section, of the printing mechanism of the invention showing the method of operating the same.

A printing machine embodying a single cylinder 12 is illustrated in Figs. 1 to 4. The cylinder or drum is continuously rotated in one direction at an even rate of speed. Reference to Fig. 2 will show the cylinder or drum as rotating in a clockwise direction. The cylinder is secured to a drum shaft 40 which is connected to a source of power (not shown) for continuously rotating the shaft and cylinder at a constant rate of speed. The cylinder is preferably formed of light weight metal, such as aluminum, and preferably driven at a comparatively slow constant rate of speed such as 60 R. P. M., although this speed may be increased or decreased under different circumstances. For purpose of illustration the cylinder 12 may be thirty inches in diameter and provided on its periphery with 600 lines of printing type.

As in conventional practice the periphery of the cylinder 12 is provided with grooves or channels 41 extending parallel to the axis of the cylinder and opening out on the opposite sides of the cylinder. These grooves are closely spaced apart circularly around the cylinder and in the illustrated embodiment of the invention 600 such grooves are provided. Removably received in each groove is a printing slug bearing type for printing a line representative of an item of merchandise if the printing mechanism is used in a billing machine or of any other matter if the mechanism is used for other purposes. Several such printing slugs are shown at 42 in Figs. 3 and 4 bearing such notations as "peaches," "pears," et cetera, and the price per gross thereof or any other saleable unit thereof.

For use in a billing machine the printing surface represented by the paper web 14 contains a successive series of blank invoices, being previously printed with either or both vertical and horizontal lines to define spaces in which the printing impressions are to be made. A partially printed invoice is shown at 44 in Fig. 3.

The device 10 previously referred to for bringing the web 14 into printing engagement with the cylinder includes a cylindrical platen 46 and two auxiliary smaller rollers 48 and 50 on opposite sides which are located approximately 90° apart with respect to the axis of the platen and adjacent to the upper side thereof. The paper web 14 is unwound from a roll 52 shown in Fig. 1. It is passed around one roller 48 and between the same and the platen 46, and thence around the lower side of the platen and upwardly between the second roller 50 and the platen. An important feature of the printing mechanism is the relation and size of the platen to the periphery of the cylinder and the spatial relationship of the printing slugs thereon. The relation is such that when the platen moves toward the periphery of the cylinder it causes the portion of the web on the underside thereof to be brought into what for the purpose of this description may be referred to as a line contact with the periphery of the cylinder. The surface area of the web portion brought into contact with the cylinder is only sufficient to receive the printed impression of one slug 42 at a time. Thus the platen 46 and the rollers 48 and 50 serve to bend or curve a section of the web so that only one line at a time can be printed thereon.

Figure 3:
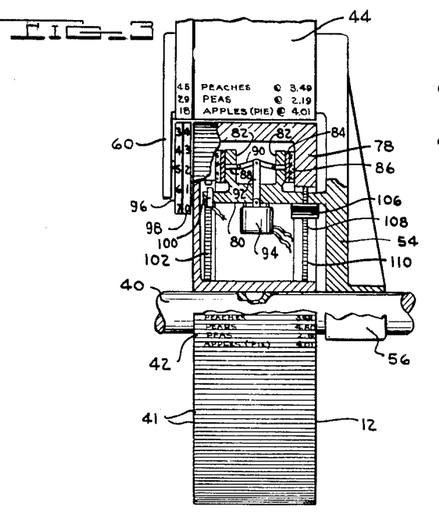
Fig. 3 is a sectional view of the printing mechanism of Fig. 2, taken along line 3—3 thereof and showing means for momentarily holding the print receiving surface in engagement with the printing cylinder.

The platen 46 and the two rollers 48 and 50 are carried on one end of an oscillatable or swingable arm 54, the opposite end 56 of which, as shown in Fig. 3, is journaled for free swinging movement on the shaft 40. The arm as well as the platen and roller are capable of swinging movement around the axis of the shaft 40 for a limited angular distance such as indicated by the full and dotted line positions of these parts in Figs. 1 and 2. The full line position indicated in Fig. 2 represents the initial starting position of the parts before a printed impression is made. The dotted line position in Fig. 2 illustrates a terminal position of the parts after the printed impression has been made on the paper web.

Figure 4:
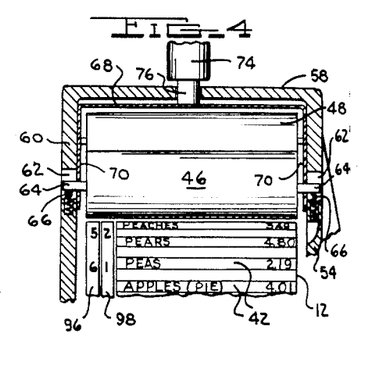
Fig. 4 is an enlarged fragmentary sectional view of the printing mechanism taken along line 4—4 of Fig. 2.

The platen 46 is carried by the arm 54 in such a manner that it and the paper web portion passing therearound is movable toward and away from the periphery of the cylinder and in the normal position clears the periphery as shown in Figs. 3 and 4. The platen is actuated toward the cylinder when a printed impression is desired bringing the curved web portion on the underside thereof into line contact with a selected printing slug 42. This is accomplished by shaping the upper end of the arm 54 so that it overlies the cylinder and forms a downwardly opening enclosure for the platen. The upper end of the arm 54 is provided with a flat plate extension 58 which extends across the cylinder in spaced relation thereto as shown in Fig. 4 and is provided on the side opposite to the arm with a downwardly turned flange 60. Beyond the periphery of the cylinder, the arm 54 on one side and the flange 60 on the opposite side are provided with aligned slots or openings 62 which are elongated in the direction of the axis of the shaft 40. The platen is disposed between the arm and the flange and is provided with stub shafts 64—64 projecting beyond the ends of the platen and extending into the slots in the manner shown in Fig. 4. The stub shafts are free to travel up and down the slots permitting movement of the platen relative to the plate extension 58 and the periphery of the cylinder. Resilient means is provided for opposing the movement of the platen toward the cylinder and for normally maintaining the platen in slightly spaced relation thereto. Such means may be in the form of coiled springs 66 located in the arm 54 and flange 60 and so seated therein and against the stub shaft as to exert an upward force upon the latter sufficient to lift the platen and paper web clear of the cylinder.

In the illustrated embodiment of the invention, the platen 46 and the side rollers 48—48 are mounted into a unitary assembly for joint movement toward and away from the cylinder 12. As shown in Fig. 4, there is provided an inverted generally U-shaped plate having a top wall 68 and correspondingly shaped depending side walls 70—70. The plate is of a size to embrace the platen and rollers and be received within the housing formed by the arm extension 58 and the flange 60 for reciprocating movement therein. The end walls 70—70 are apertured to receive the stub shafts 64—64 of the platen and stub shafts 72—72 of the rollers. The apertures are of a size to permit rotation of the platen and rollers but hold the same against bodily movement relative to one another and the plate. Means is provided for reciprocating the unitary assembly of the plate, platen and rollers toward and away from the drum. This means is preferably in the form of a solenoid 74 mounted on the arm extension 58 and provided with a reciprocating plunger 76 which is magnetically influenced by the coil of the solenoid and extends downwardly through the arm extension 58 and is connected at its outer end to the plate 68 and the platen assembly for jointly reciprocating the same therewith. The relation of the plunger to the solenoid is such that when the latter is energized it forces the plunger and the platen assembly toward the periphery of the cylinder against the resistance of the springs 66—66 thereby bringing the web portion under the platen into printing engagement with a line of type on the cylinder. As will be pointed out hereinafter the solenoid 74 is electrically connected to the electrical devices previously referred to and will become effective following depression of the trip bar 38 of the control unit 18.

An important feature of the invention is the provision for moving the platen and the web portion therearound along with the continuously rotating cylinder 12 as the printing impression is made. In the present illustrated embodiment of the invention this means comprises a clutching mechanism illustrated in Fig. 3 which upon depression of the trip bar 38 and operation of the electrical mechanism is caused to engage the arm 54 with the rotating cylinder and jointly rotate the two elements together for a part of the rotation of the cylinder. As shown in Fig. 3, the cylinder 12 is hollowed out interiorly and provided with a radially inwardly projecting flange 78 spaced laterally from the web or disc portion of the cylinder. Extending from the arm 54 inwardly under the flange 78 is an arcuate member or platform 80 which carries an electrically operated clutch assembly capable of engaging opposed inside surfaces of the cylinder disc portion and the flange 78 to momentarily lock the arm to the cylinder for joint rotation therewith. As shown in Fig. 3 the platform 80 is provided with two spaced apart outwardly radially projecting members 82—82 which are received between the cylinder disc portion and the flange 78 in slightly spaced relationship thereto. Disposed beyond the outer face of each member 82 is a plate 84 carrying friction material 86 for engagement with the side portion of the cylinder and the flange 78 with which it is associated. Each plate 84 is mounted for bodily movement outwardly of the member 82 with which it is associated and such outward movement will bring the frictional facing thereof into engagement with the flange 78 and the side portion of the cylinder and frictionally grip the arm and platen assembly to the rotating cylinder.

The two clutching plates 84—84 are operated in unison by a toggle mechanism. As shown in Fig. 3, each plate 84 is mounted upon a short link 88 which slidably passes through an aperture in the member 82 with which it is associated and is pivotally connected at its inner end to a link 90 forming part of the toggle mechanism. Each link 90 is pivotally connected at its inner end about a common axis to a radially reciprocating rod 92 which passes through the platform 80 and is connected therebelow to a plunger of a solenoid 94. It is apparent from the relation of the links 88—88 and 90—90 to the rod 92 that upon radial movement of the rod 92 toward the axis of the shaft 40 the plates 84—84 will be thrust outwardly into frictional engagement with the cylinder. The solenoid 94 is electrically connected with the electrical mechanism previously referred to and its energization is controlled thereby to clutch the arm 54 to the cylinder for joint rotation. As shown in Fig. 3, the platform 60, including the members 82—82, is integrally connected to the arm 54 and is preferably cast in one unit in the manner shown. Preferably the arm 54 and its associated parts is formed of light weight metal, such as aluminum, in order to reduce the inertia to be overcome by the clutching device.

Associated with the printing device 10 are one or more numbering wheels which are adapted to print on the blank invoice the quantity of an item ordered. In the illustrated embodiment of the invention two such numbering wheels are provided carrying figures from zero to 9 on their outer peripheries which are raised thereabove for printing engagement with the blank invoice. One wheel is indicated at 96 and the other at 98 and as shown in Figs. 3 and 4 they are disposed on one side of the printing cylinder 12 in position to print numbers in the left column of the invoice. The two wheels together are adapted to print a quantity numbering as high as ninety-nine, and it is understood that by the provision of a third wheel quantities up to nine hundred and ninety-nine may be printed. The two printing wheels 96 and 98 are of considerably less diameter than the printing cylinder 12 and are carried by the arm 54 and the platen assembly for joint swinging movement therewith. The printing wheels rotate about an axis parallel to the shaft 44 and in such position that a peripheral portion thereof is flush with the outer periphery of the cylinder 12 as shown in Figs. 3 and 4.

The two numbering wheels are independently rotatable about their common axis and supported by shaft means on the radially inwardly extending flange 60 disposed on the side of the cylinder 12 opposite to the arm 54. These numbering wheels are electrically associated with the column of depressible buttons 34 of the control unit 18 previously mentioned. The wheel 98, representing the digit column, is associated with the right row of buttons of the column 34. The wheel 96, representing the tens column, is electrically associated with the left row of depressible buttons in column 34. The electrical association of control unit 18 with the numbering wheels is such that upon depression of a button in one or both rows the wheel or wheels will rotate to bring the number on the periphery thereof corresponding to the number depressed into position to print upon the invoice when the latter is brought into printing engagement with the cylinder.

Electrical means is associated with the printing device for bringing the blank invoice on the platen 46 into printing engagement with the selected line of type on the printing cylinder 12. This means includes an electronic pick-up member indicated at 100 located on the inside of the cylinder such as adjacent to the disc side portion of the cylinder. The latter is widened adjacent to the periphery to provide an inner peripheral surface opposite to the electronic pick-up member 100 upon which are fixed a plurality of relatively small elements or vanes 102. These vanes are mounted in circularly spaced apart relation around the axis of the cylinder and when the latter is rotated they sweep past the pick-up member. The vanes 102 correspond in number to the lines of type on the outer periphery of the drum 12 and for the purpose of selecting the desired line of type each vane may be considered as corresponding to one of the different lines of type on the printing cylinder. One of these vanes may be considered as a zero reference from which computations are electrically made by the electronic mechanism. The pick-up member 100 is adapted to count the vanes from this zero reference as they sweep past the member. The pick-up member 100 is electrically connected by leads 104 to the pulse counter control box indicated at 24 in Fig. 1.

The operation of the electronic pick-up and computing mechanism is such that upon selection and depression of a number in column 36 of the control unit, and following depression of the trip bar 38 thereof, the mechanism will count the number of vanes from the zero reference to the number depressed in the column 36. Instantly as soon as that number is reached the electronic mechanism energizes the solenoid 74 and the solenoid 94 thereby causing the platen to move toward the printing cylinder and the arm and platen assembly to be clutched to the cylinder for joint rotation. While the platen is in engagement with the cylinder and is traveling therewith the printing impression on the selected line of type takes place on the invoice blank.

The operation of the electronic mechanism may be more fully illustrated by an example. Assume that a customer's name and address and the date is desired to be printed on the invoice blank. Buttons in column 36 of the unit corresponding to the customer's code number are depressed. Upon operation of the trip bar 38 the electronic pick-up 100 commences to count the number of vanes from the zero reference vane. When the number of vanes 102 equal to the customer's number are counted by the pick-up member 100, the line of type bearing the customer's name, address and, if desired, the date, is commencing to pass under the platen 46. As soon as this number is reached, the electronic pulse counter unit 24 causes current to be supplied to the circuits of the solenoids 74 and 94 energizing the same and causing the platen to travel toward the periphery of the cylinder and the clutch mechanism to couple the arm 54 and the platen assembly to the cylinder for joint rotation therewith. There is a slight time delay in the engagement of the platen with the periphery of the cylinder during which the platen and the arm are brought up to the same speed as the cylinder. During this time lag the line of type bearing the customer's name, et cetera, moves under the platen and is in such position that when the platen attains the speed of the cylinder it brings a line portion of the invoice blank into engagement with the selected line of type to receive the impression thereof. Thereafter the arm and the platen assembly travel for a part of the revolution of the cylinder while the printing impression is completed. Following the printing of the selected line of type the solenoids 74 and 94 are deenergized permitting the platen and invoice portion to lift free of the cylinder and the platen assembly and arm 54 to return to their initial starting position preparatory to printing another line on the invoice. The arm assembly may be returned to its initial starting position by spring means such as that shown in Figs. 9 and 10, and hereinafter described.

A similar procedure follows for printing an item in stock and the quantity ordered. The button or buttons in column 34 corresponding to the quantity ordered are depressed. The code number of the item is noted and the buttons in column 36 corresponding thereto are depressed. Thereafter, upon depression of the trip bar 38, either one or both number wheels 96 and 98 are rotated to present the quantity figure in printing position and at the same time the electronic pickup member 100 commences to count the vanes 102 from the zero reference. As soon as the number of vanes counted reaches the code number of the item selected, at which time the line of type representing the item is commencing to pass under the platen, the solenoids 74 and 94 are energized clutching the arm 54 and associated parts to the cylinder and bringing the invoice portion on the underside of the platen into printing engagement with the selected line of type and with the selected quantity figure on the number wheels. Thereafter the operation of the parts is the same as that previously described in connection with the printing of the name and address of a customer.

In the initial setting up of the machine, the clutching mechanism and the platen assembly are adjusted so that they are timed to bring the web portion 14 on the platen into contact with the selected line of type. However, to insure perfect alignment of the parts at the time the printing impression is made, an auxiliary mechanism may be provided to lock the platen assembly to the cylinder at the point when the selected line of type is immediately under the platen and in position to make a perfect printing impression. This mechanism may comprise, as shown in Fig. 3, a solenoid 106 bearing a magnetically influenced plunger 108 adapted when the solenoid is energized to move radially outwardly of the cylinder into engagement with any one of a series of teeth or notches 110 formed on the inner periphery of the flange 78 of the cylinder. The solenoid is secured to the platform 80 and is movable therewith. Each notch 110 is generally V-shaped and the engaging end of the plunger is tapered for closely fitting the same when fully entered therein. The solenoid is electrically associated with the circuits of the solenoids 74 and 94 and becomes energized at the same time as they do. The notches 110 are so numbered and positioned with respect to the vanes 102 and the lines of type 42 that when the plunger 108 is fully received in one of the notches one of the lines of type will be positioned under the platen to make a perfect printing impression on the paper web. As the plunger enters a notch it will, unless the notch is accurately centered opposite thereto, slidably engage one or the other sides of the notch and by a wedging action shift the platen assembly slightly angularly with respect to the cylinder to bring the web portion 14 under the platen into alignment with the selected line of type. This action occurs during the time the clutching mechanism is becoming fully effective and as the platen assembly is attaining the speed of rotation of the cylinder.

Figure 5:
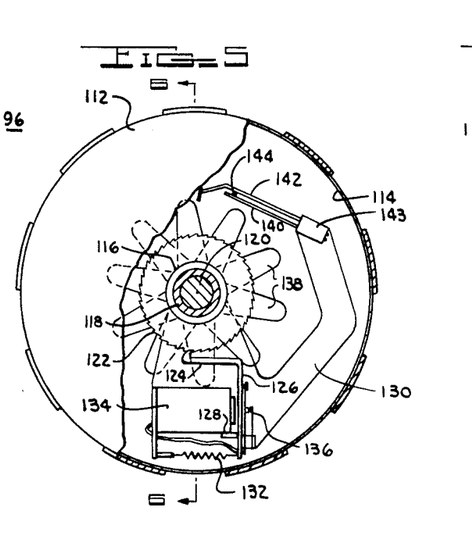
Fig. 5 is a side view, partly broken away in section, showing a quantity printing wheel of the invention and the operating parts thereof.

Each quantity printing wheel 96 and 98 is similarly constructed and operated by the electronic mechanism. The mechanism for rotating either wheel and bringing the selected number thereon into printing position is illustrated in Fig. 5. One wheel such as the "tens" wheel 96 is shown in the figure, it being understood that the other quantity wheel is similarly constructed and operated.

The wheel itself comprises a metal disc 112 having a right angularly bent peripheral flange 114 upon which the raised printing numbers are carried. The disc portion of the wheel is secured to a hub 116 which is freely rotatable upon a tubular stub shaft 118 encircling a second solid shaft 120 upon which the other number wheel 98 is freely rotatable. Fixed to the hub is a ratchet gear 122 with which one end of a pawl 124 is engageable. The pawl is connected at its opposite end to a wide plate 126 which is rockable about a knife edge 128 forming part of a supporting bracket 130. One or more coiled springs 132 extend between the plate and the bracket and exert a yielding force on the plate tending to move the pawl in the direction to engage a tooth on the ratchet gear and rotate the same and the wheel the distance of one tooth. The force of the spring 132 is interruptedly opposed by a rapid operating magnet indicated by the coil 134 mounted on the bracket 130. A circuit breaker 136 for the coil winding is mounted on the rocking plate 126 and functions to open the circuit to the coil every time the pawl returns to a position to engage the next tooth on the ratchet gear. Thus when the current is supplied through the circuit to the coil the magnet is energized to shift the pawl for engagement with the next successive tooth and is immediately de-energized to allow the springs 132 through the plate 126 to move the pawl in the opposite direction and rotate the ratchet gear one tooth. This operation takes place very rapidly and by this means the wheel is intermittently rotated at a relatively fast rate of speed about its axis of rotation.

Associated with the ratchet feeding means for rotating each numbering wheel are control elements for stopping the rotation of the wheel when the selected number reaches the printing position. This means comprises a plurality of fingers 138, ten in number, fixed to the hub 116 and equally circularly spaced therearound as shown in Fig. 5. These fingers are thin strips of metal axially spaced apart on the hub and all are preferably mounted within the lateral dimension of the wheel. Supported by the bracket 130 in close relation to the path of travel of the fingers and parallel to the axis of the wheel supporting shafts are the electrical make and break switches, each associated with a different finger. Each such switch comprises a fixed electrical contact element 140 and a flexible contact blade 142 overlying the fixed element and extending parallel thereto. One end of each of these elements is insulatively supported on the bracket. The opposite free end of the flexible blade 142 projects beyond the free end of the fixed element with which it is paired and is bent inwardly into the path of travel of the finger with which the switch is associated. Between the blade and fixed element of each switch and carried thereby are contacting buttons 144 which normally engage to close the circuit therethrough. However, when one of the fingers engages its respective blade it flexes the same away from the fixed element with which it is paired and opens the circuit. The fixed elements are electrically connected in series to one another and each is connected into the circuit of the coil 134. The movable blades 142 are each electrically connected by a separate circuit to a depressible button in column 34 of the control unit 18. Although normally the contact 144 between each pair of switch elements 140 and 142 is closed, the raised position of the control button of the manual selecting instrument 18 associated therewith maintains the circuit in open condition preventing actuation of the electromagnet 134.

To rotate either wheel 96 or 98 to present the desired quantity number for printing, a button in either or both rows of the column 34 of the control unit 18 is depressed. The depression of a button in the tens row of the column will, for example, close the circuit to the electromagnet through one of the pairs of switch elements 140 and 142 and supply current to the electromagnet 134. The latter will operate intermittently as previously described to rotate the wheel 96 until the finger 138 corresponding to the selected number strikes the unbent end of its respective switch element 142 and opens the circuit. Further rotation of the wheel is discontinued and in this position the selected number appears on the upper side of the wheel flush with the periphery of the cylinder 12 and in position to print on the web portion 14 brought into engagement therewith. During the rotation of the wheel certain of the remaining fingers 138 will open their respective switch elements but due to the fact that the circuit to the electromagnet is not closed through their respective buttons the opening of these contacts is ineffectual.

Figures 7, 8:
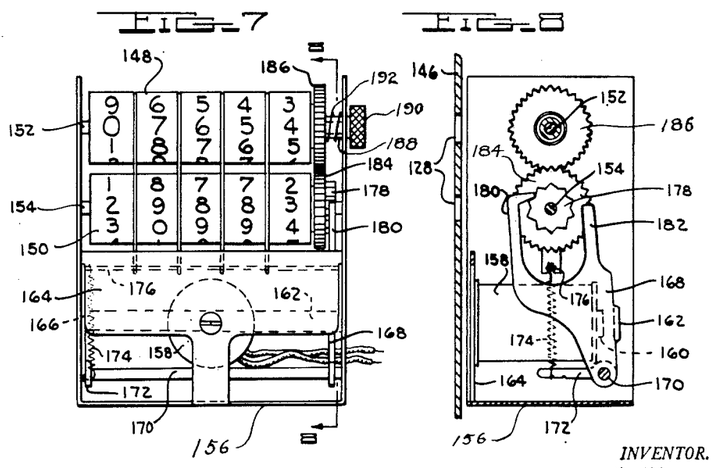

At the same time either one or both of the quantity wheels is rotated to present the selected number for printing, certain relay circuits in control box 20 are operated which when the merchandise item in column 36 of the control unit 18 is selected and printed on the web 14 will actuate a recording device in the inventory register corresponding to the item and display through a window thereof the condition of the stock of the item at any instant. As previously mentioned the inventory register 26 contains a plurality of windows 28. These are located in the front panel 146 of the inventory register and behind each window is a numbering device such as illustrated in Figs. 7 and 8. For convenience in ascertaining the items being exhibited by the inventory register, a card or name plate bearing the name of the article may be placed above each window. Each numbering device is so constructed that it will not only show the stock on hand but also the quantity of merchandise distributed or sold over a period of time.

Referring to Figs. 7 and 8, each numbering device comprises two sets of number wheels 148 and 150, each set being mounted on a separate shaft 152 and 154 respectively which are preferably arranged parallel and in superimposed relationship as shown in the figures. Each set of wheels is similar to that employed in an odometer and comprises a plurality of wheels independently rotatable on their shaft and so operatively connected that after the wheel at the right end of the series completes one revolution it rotates the next adjacent wheel to its left sufficient to bring the next successive number into position to be seen through the window. This operation occurs successively throughout the remaining wheels of the set as in conventional odometers. From left to right the wheels of each set represent the digits, tens, hundreds, et cetera, of any given number.

A novel feature of the numbering devices in the inventory register is the relation of each set of wheels to the merchandise item which it represents. One set of wheels in each device is arranged to add while at the same time the other set of wheels subtracts. The upper set 148, for example, is arranged to subtract and the number displayed thereby through the window represents the stock of an item remaining on hand. The lower set is arranged to add and the number exhibited thereby through the window represents the quantity of the item sold from the commencement of any given period of time. The sets of wheels of each device are operated from a single actuating mechanism and for simplicity in construction one set of wheels is directly geared to the other and will rotate the same extent but in the opposite direction. One or both sets of wheels are provided with means for resetting. This is especially true of the set of wheels 148 which represent the stock on hand. As new stock is added the wheels can be adjusted to a higher figure independently of the other set of wheels, which figure will represent the stock on hand of the item plus the additional merchandise received. The permanent recorder, such as the camera 30 in Fig. 1, makes periodical records of the numbers displayed by the inventory register and from these records an accurate accounting can be kept of all incoming and outgoing merchandise over a lengthy period of time enabling careful checks and comparisons to be made for the guidance of future business transactions.

The operating mechanism of each numbering device may be of a suitable type, the one herein illustrated following conventional electrically operated counting devices. Each numbering device is supported in a U-shaped bracket 156 in the upper portions of the side walls of which the two shafts 150 and 152 are mounted. Below the shafts and between the side walls of the bracket is an electromagnet including a fixed coil 158, core 160 and an oscillating armature 162. The coil is fixed to a front plate 164 forming part of the bracket. The armature 162 is in the form of an elongated, metal strip extending across the core and normally spaced therefrom and is connected at its opposite ends to a pair of vertical plate members 166 and 168. Both plate members are journalled on a cross rod 170 located on a level below the coil and secured at its opposite ends of the side walls of the bracket. Fixed to the rod 170 is an arm 172 to the outer end of which is attached a tensioned spring 174. The opposite upper end of the spring is connected to a cross rod 176 to which the interleaving plate elements of the numbering wheels are attached as in conventional odometers. The spring is so related to the armature that it yieldingly urges the armature away from the core 160. One plate member such as member 168 is lengthened at its upper end and bifurcated for driving a star wheel 178 on shaft 154. The two arms of the bifurcated end of the plate member are shown at 180 and 182. The arms are shaped as in conventional practice such that when oscillated back and forth they alternately engage the star wheel and intermittently rotate the same in one direction.

The star wheel 178 is fixed to the side of a gear wheel 184 mounted on shaft 154 and the gear wheel in turn is fixed to the right end wheel of the set of numbering wheels 150. Carried by shaft 152 and similarly fixed to the right end wheel of the set of wheels 148 is a gear wheel 186. The latter normally engages the teeth of the gear wheel 184 and the relation is such that when gear wheel 184 is rotated by the star wheel the gear wheel 186 is simultaneously rotated but in the opposite direction. Slidable on the shaft 152 is a sleeve 188, one end of which projects through the adjacent side wall of the bracket 156 and carries a knob 190 and the other end of which is secured to the gear 186. A coiled spring 192 encircling the sleeve is seated at one end on the wall of the bracket and at its opposite end on the gear 186 and yieldingly urges the latter toward the number wheels 152 and in engaged position with the gear 184 as shown in Fig. 7. It is evident that the knob 190 may be pulled out drawing the gear 186 and the first or right end numbering wheel therewith. This will disengage the two gears 184 and 186 from one another and enable an operator to reset the stock-on-hand numbering wheels whenever new shipments of stock are received. The operating connection between the digits and tens wheels of the set 152 may be constructed in any suitable manner to permit separation thereof during resetting without disturbing the drive relation therebetween.

The inventory register 26 is electrically connected by cable 194 with the relay circuit control box 20 and by means of the relays therein the numbering wheels of the selected item are changed to the same extent as the number depressed by the buttons in column 34 of the control unit 18. Thus the register provides a running or current inventory of all stock on hand and the amount of any one item sold since the commencement of any given period.

The control unit 18 is preferably provided with additional control elements for canceling a printed invoice item or for resetting the controls in the event an error has been made before the printing operation is performed. For these purposes there is provided a canceling trip bar 196 and an error trip bar 198 on the control unit 18. For canceling purposes there is provided a blank printing slug on the periphery of the cylinder 12 which when the cancel trip bar is depressed causes the slug to blank out the preceding printed invoice item. This particular slug is given a number in the electronic counter mechanism, and when the cancel bar is tripped the electronic controlling devices count the vanes 102 as they sweep past and when the canceling slug moves into printing position cause the platen to move the invoice blank into engagement with the slug to receive the obliterating impression thereof. At the same time this occurs the electrical control mechanism reverses any changes made in the indicating mechanisms of the inventory register. The error trip bar is electrically connected into the control mechanisms for the quantity printing drums and for the printing cylinder and in the event the operator depresses the wrong buttons on the control unit 18 and realizes the error before the printing operation the operator may reset the machine for a new printing operating canceling all initially controlled elements of the machine.

Multi-cylinder printing machine

Figure 9:
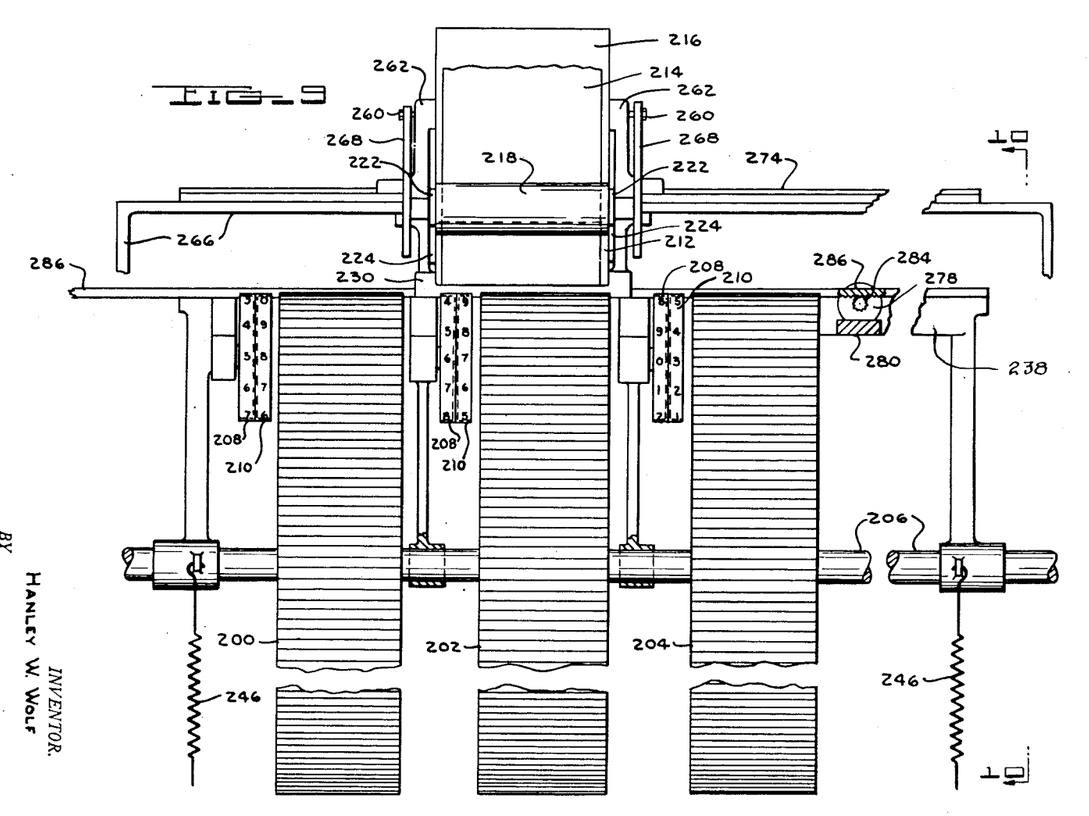
Fig. 9 is a front elevation of a modified form of billing machine employing a plurality of printing cylinders and showing a traveling web feeding carriage for receiving printing impressions from any one of the cylinders.
Figure 10:
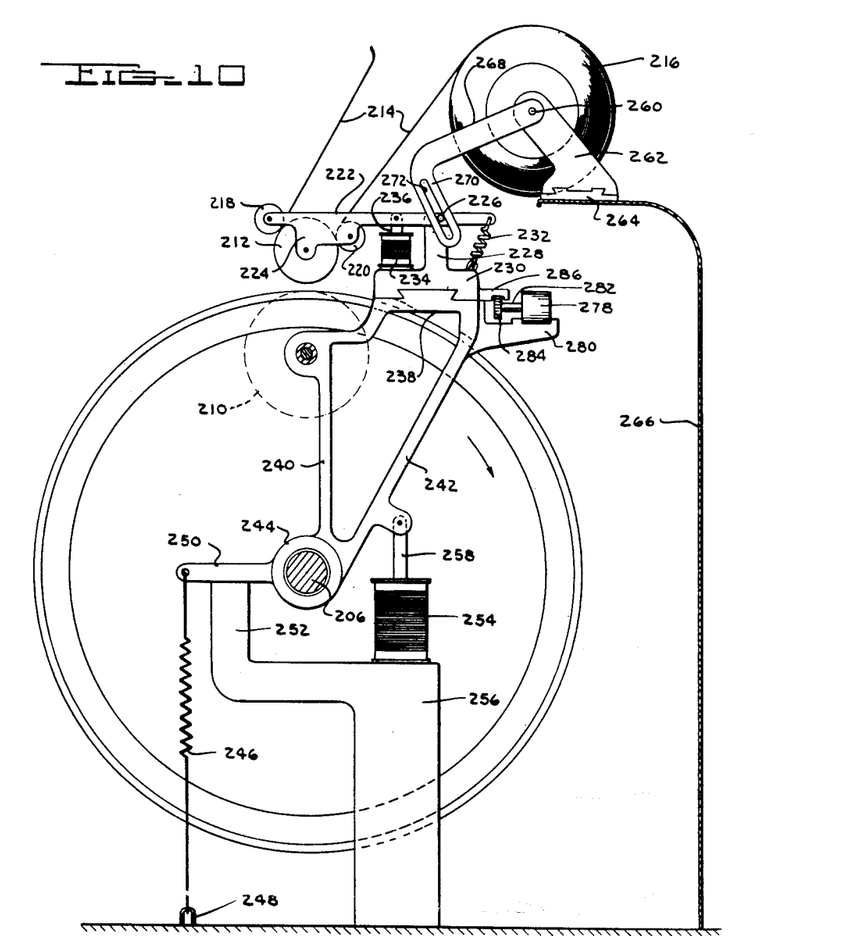
Fig. 10 is an end view of the billing machine of Fig. 9 showing the operating parts for mounting the web feeding carriage for travel and for bringing the web into printing engagement with one of the printing cylinders of the machine.

The apparatus heretofore described has been limited to a single printing cylinder and associated parts. Where large quantities of different items are in stock it is desirable as previously described to provide additional printing cylinder units rather than enlarging a single cylinder. In Figs. 9 and 10 there is illustrated a machine composed of a plurality of rotatable cylinders or drums coaxially related and from one to another of which the platen assembly is capable of traveling to receive the related printing impression. Three printing cylinders 200, 202 and 204 corresponding to the cylinder 12 previously described are shown in Fig. 9 and form, as an example, a part of a set of seven such cylinders. The printing cylinders are all mounted on a common driving shaft 206 which applies a torque to rotate the cylinders at the same rate of speed and in the same direction. Associated with each cylinder and on the left side thereof as viewed in Fig. 9 are a pair of quantity printing wheels 208 and 210 corresponding in function and operation to the quantity wheels 96 and 98 previously described.

The platen assembly carrying the paper web upon which blank invoices are printed is arranged to travel from one printing cylinder to another in accordance with a control circuit hereinafter described associated with the top row of buttons 32 on the selector control unit 18. The platen is indicated in the modified form of the invention at 212. A web of paper 214 is curved around the bottom portion of the platen and successive sections of the web are drawn off from a roll 216 located behind and slightly above the platen. The platen is of such a size as compared to the cylinders and the printing slugs therein that when moved into engagement therewith only one line of type is impressed on the paper web. Associated with the platen are two rollers 218 and 220 corresponding to rollers 48 and 50 previously described. The platen and the rollers are supported on a level above the cylinders by an inverted U-shaped bracket member 222, in the opposite side walls 224—224 of which the platen and rollers are journaled.

The platen assembly supporting bracket 222 extends rearwardly of the machine and is pivotally connected at 226 to an upright portion 228 of a slide carrier 230. A spring 232 which corresponds in function to the springs 66—66 is connected to the rear end of the bracket and to the carrier and yieldingly urges the platen assembly upwardly away from the cylinders. The coil of a platen actuating solenoid similar to solenoid 74 is indicated at 234 and is mounted on the slide carrier. The armature or plunger 236 of the solenoid is pivotally connected to the forward end section of the bracket and it is evident from the relation of the parts shown in Fig. 10 that when the solenoid is energized the bracket will be rocked downwardly into printing engagement with any one of the cylinders over which it may be located.

The platen assembly is not only supported for rocking movement into and out of engagement with the cylinder over which it is disposed but also for lengthwise travel from one cylinder to the other and also for bodily swinging movement in the direction of rotation of the cylinders indicated by the arrow in Fig. 10. This is accomplished by providing a horizontally extending track member 238 extending parallel to the shaft 206 and located slightly rearwardly of the upper portions of the cylinders. The upper surface of the track member and the base of the carrier 230 are interengaged or dovetailed in the manner shown in Fig. 10 to provide straight bodily translational movement of the carrier and platen assembly from one end of the track to the other end thereof. As shown in Fig. 9, the track member extends the length of the series of printing cylinders on the drive shaft 206 and between each cylinder and at the opposite end of the cylinder series the track member is swingably connected to the drive shaft by two converging arms 240 and 242 which together with the track member form a support of general triangularly shaped formation. The meeting ends of the two arms 240 and 242 of each track support form a journal mounting 244 on the shaft 206 and it is evident that as a result of this connection the track member, the slide carrier 230 and the platen assembly are capable of swinging motion about the shaft as an axis.

The track member 238 and all the parts mounted thereon are constrained to swing in a forward direction counter to the direction of cylinder rotation by a spring 246 at each end of the cylinder series connected at its lower end to a fixed support 248 and at its upper end to an arm 250 projecting forwardly from the journal mounting 244. A fixed member 252 is adapted to be abutted by the arm 250 to limit the forward swinging motion of the track and associated parts to the position shown in Fig. 10 which is the initial position of the parts prior to the printing of a line of type on the paper web.

The track 238 and its associated parts are swung in the direction of the rotation of the cylinders by means corresponding in function to the solenoid operated clutch 84—84 previously described. In the present embodiment of the invention this means comprises a solenoid including a coil winding 254 mounted on a stationary support 256 to which the stop member 252 may be connected as shown in Fig. 10. The magnetically attracted armature or plunger of the solenoid is indicated at 258 and has its upper end pivotally connected to the arm 242 of one of the end supports for the track members. Upon energization of the solenoid, the plunger is drawn into the coil and the track and associated parts are caused to be swung in the direction of cylinder rotation against the yielding resistance of the springs 246. The pull exerted by the solenoid is so governed that within a short distance of swinging movement the track and associated parts reach the speed of rotation of the cylinder at which time the platen engages the cylinder over which it lies and moves therewith at the same rate while the printing operation is performed. It is understood, as in the previously described modification of the invention, that the supporting parts of the platen assembly are composed of light weight material, such as aluminum, in order that their inertia may be quickly overcome by the solenoid. In operation, the sudden energization of the solenoid imparts a kick to the track and associated parts bringing the speed of the latter quickly up to that of the cylinders within a short distance of angular movement about the axis of the shaft 206. The current supplied to the solenoid can be varied at the time of initial installation of the machine to determine the exact amount of pull or "kick" necessary in order to bring the speed of the bodily swinging movement of the platen up to the cylinder speed at the moment the selected line of type on the adjacent cylinder is in position opposite to the paper web for printing engagement therewith.

The roll 216 of web paper is capable of following the movement of the carrier 230 and the platen assembly along the track 238. Although it might be mounted directly on the bracket 222, it is preferred in order to lighten the weight of the carrier to mount the roll on a separate track and provide means for causing the roll to only partake of the carrier travel on the track and no other movement thereof. This is accomplished by mounting the paper roll upon a stub shaft 260 which has its opposite ends journaled in a U-shaped support 262, the bottom side of which is shaped like the carrier 230 to slide on a track 264. The latter extends parallel to the track 230 and is supported by the back wall 266 of the machine at a height above the track. Pivoted to the ends of the stub shaft 260 on opposite sides of the roll are a pair of arms 268—268. Each arm inclines downwardly and forwardly from the paper roll and intermediate its ends it is bent to provide a downwardly and rearwardly inclined end section 270. Each end section 270 of the arms is slotted longitudinally as at 272 for receiving the adjacent end of the pivot pin 226 about which the bracket 222 is movable relative to the carrier. The slotted end sections 270 overlap the opposite sides of the bracket and the upright portion 228 of the carrier and it is evident that when the latter slides on the track 238 it will cause the arms 268—268 and the paper web roll 216 to travel therewith. When the bracket 222 rocks to engage the platen with a cylinder, and when the track 238 and its associated parts swing about the axis of the shaft 206, the pivotal mounting of the arms 268—268 on the stub shaft 260 plus the slotted connection between the arms and the pivot pin 226 frees the paper roll and its support from any such movement therewith.

Figure 6:
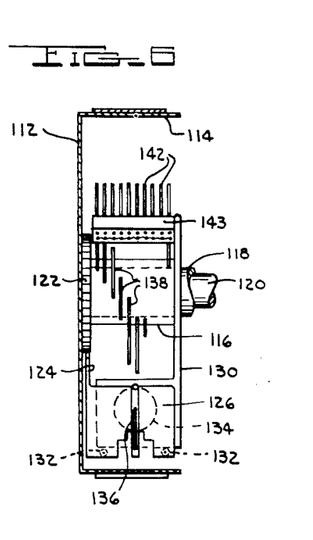
Fig. 6 is a vertical sectional view of the quantity printing wheel of Fig. 5 taken along line 6—6 thereof.

The quantity printing wheels 208 and 210 associated with each printing cylinder are independently journaled for rotation on shafts corresponding to shafts 118 and 120 previously described and the shafts in turn are supported in a lateral extension 274 of the adjacent frame member 240 as shown in Fig. 10. As in the previously described embodiment of the invention the quantity wheels have one portion of their respective peripheries extending flush with upper portion of the cylinder with which it is associated and in position to print in the quantity column of an invoice blank brought into engagement with the cylinder by the platen. Each quantity wheel contains an electrical control mechanism of the character shown in Figs. 5 and 6 for predisposing the selected number in printing position. By virtue of the connection of the quantity printing wheels 208 and 210 to the track member they are capable of swinging therewith as in the earlier described embodiment of the invention.

The carrier 230 and the platen assembly are shifted along the track member 238 by power means and stopped opposite the selected printed cylinder by control means operatively connected to the power means and the top row of buttons 32 on control unit 18. For this purpose there is provided an electric motor 278 mounted on a rearwardly projecting ledge 280 of the track member 238 midway of the length thereof. The shaft 282 of the motor carries a pinion 284 engageable with the teeth of a rack 286 fixed to the back side of the carrier 230 and projecting from opposite sides thereof parallel to the track as shown in the broken sectional view of Fig. 9. The extension of the rack from opposite sides of the carriage 230 is sufficient to permit the motor to shift the carrier opposite any one of the cylinders.

Figure 12:
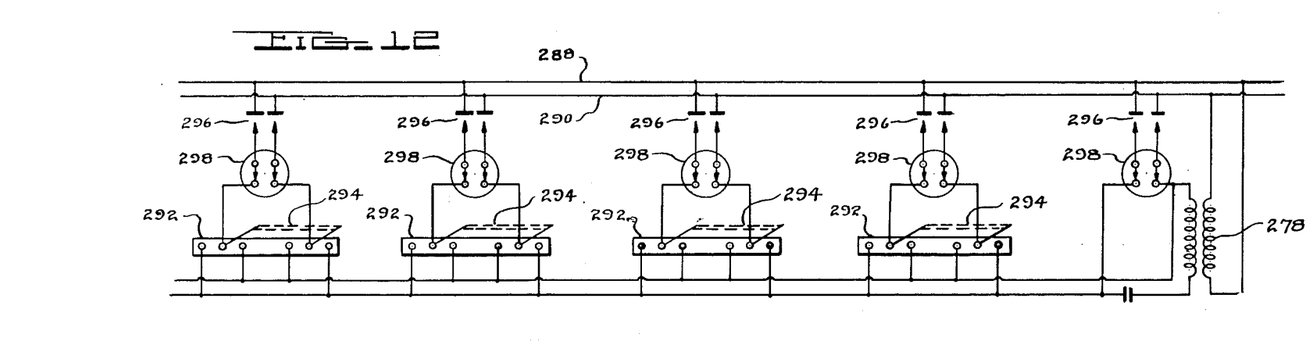
Fig. 12 is a circuit diagram for controlling the movement of the travelling platen in a multiple set of printing cylinders.

The platen travel on the track 238 is electrically controlled by a circuit such as that illustrated in Fig. 12. The circuit is of conventional design for electrically controlling the travel of a body on a track in opposite directions and for stopping the same at intermediate positions along the track. The motor 278 for driving the platen assembly carriage is diagrammatically illustrated at the right of Fig. 12 and may be a capacitor run motor or a split field motor. It is connected to two main leads 288 and 290 for receiving current from a suitable source of electrical energy (not shown). Mounted alongside of the track 238 are similar change-over or reversing switch devices 292 corresponding in number and position to the printing cylinders or drums 200, 202, 204, et cetera.

Each change-over switch device 292 includes two paired switch members 294 which when closed on one side will cause the current to flow in one direction to drive the motor and when closed on the opposite side will cause the current to flow in the opposite direction to reverse the motor. As the platen travels to the right along the track it will successively pass by the switch assemblies 292 and engage and swing their respective paired switch members to the right and as diagrammatically illustrated in Fig. 12 close the circuits therethrough to drive the motor in one direction. Similarly as the platen travels in the opposite direction it will successively engage and swing the paired switch members in the opposite direction, reversing the current flow to the motor. To control the stopping of the platen opposite a selected cylinder or drum, there is associated with each switch assembly a make and break switch 296. Each make and break switch may be associated directly with one of the depressible buttons 32 on the selector control unit 18 or preferably controlled by relays in the relay circuit box 20 electrically connected to the depressible control buttons 32. Electrically interposed between each change over switch device and its make and break switch is a limit switch diagrammatically illustrated at 298. These limit switches are adapted to be opened and closed as the platen carrier travels thereby.

To operate the multi-cylinder embodiment of the invention, the operator determines from a code list upon which printing cylinder or drum appears the desired item to be printed. The items may be grouped for convenience in alphabetical order on the drums. Upon determining the cylinder which carries the type for printing the desired item, the operator depresses the button 32 corresponding to the drum. This closes the switch 292 in Fig. 12 corresponding to the button. Irrespective of the initial starting position of the platen carrier, whether to the right or left of the selected drum, the closing of the corresponding switch will cause the motor to rotate in the direction to advance the carrier toward the selected drum and the change-over switch device 292 opposite thereto. As soon as the carrier reaches the switch device 292 opposite the drum it opens the limit switch 298 associated therewith and breaks the circuit to the relay holding the switch 292 closed. The opening of the latter cuts off the current supply to the motor, and the stopping of the latter automatically stops the travel of the platen in printing position opposite the selected drum. A similar sequence of operations occurs when any other drum in the series is selected. Thereafter, the operator depresses one or more buttons in each of the vertical columns 34 and 36 to cause the printing of the merchandise item and the quantity thereof ordered similar to that described in the single cylinder embodiment of the invention. An inventory register, similar to that previously described, may be electrically or otherwise operatively connected to the control mechanisms of the multi-cylinder assembly for providing a running or current inventory of all stock on hand.

*Circuit control for platen assembly*

Figure 11:
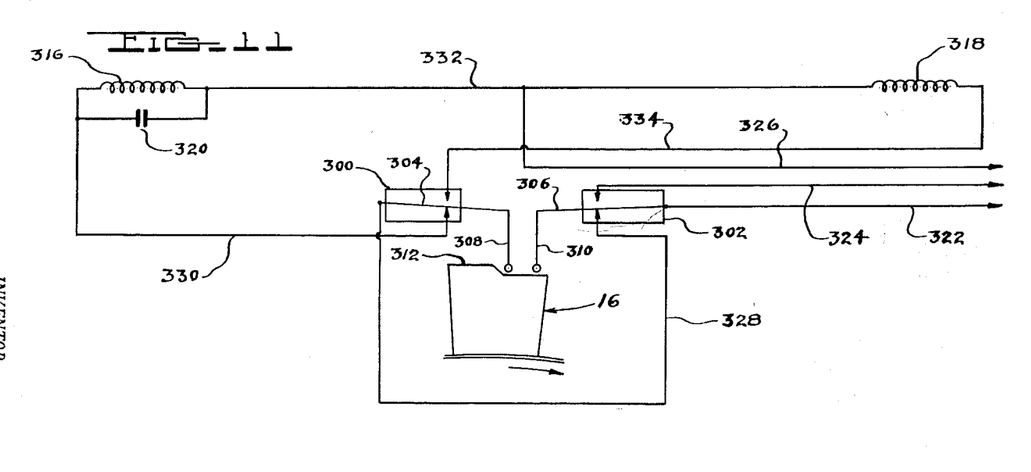
Fig. 11 is a circuit diagram for controlling the operation of the printing mechanism.

In either embodiment of the invention previously described it is preferred to provide a circuit control for the platen assembly such as that diagrammatically illustrated in Fig. 11. As briefly referred to in the description of the general organization, there is provided as shown in Fig. 1 a switch control box 25 disposed adjacent to the housing for the platen assembly. This control box carries a pair of micro-switches or similar electrical mechanisms for governing the action of the various control mechanisms after each printing operation has been initiated. These micro-switches carry operating elements projecting into the path of travel of the swinging head or body generally indicated at 16 in Fig. 1 in which the print receiving surface or invoice blank is positioned. Referring to Fig. 11 the two micro-switches are diagrammatically indicated at 300 and 302 and are supported in any suitable manner adjacent to the path of travel of the swinging head or platen carrier 16. A movable contact member is included in each micro-switch, the member for micro-switch 300 being indicated at 304 and the member for micro-switch 302 at 306. An operating arm for the contact member 304 is diagrammatically illustrated at 308 and similarly an operating arm for the contact member 306 is shown at 310. These arms are arranged to project into the arcuate path of travel of the platen carrying body 16 for successive engagement thereby and for this purpose there is provided an elevation or raised land 312 on the body having an inclined front face up which the lower ends of the arms are capable of travelling. As shown in Fig. 11, the arms are so positioned with respect to the land 312 that they successively engage the same when the body 16 is moved in the direction of the printing cylinder's rotation, arm 308 and its respective blade 304 being engaged and operated thereby slightly in advance of the other arm and its blade 306.

The micro-switches 300 and 302 are associated in the circuits for operating the movable parts of the printing mechanism. Diagrammatically shown at 316 in Fig. 11 is the clutch solenoid 94 (Fig. 3) or the solenoid 254 (Fig. 10) for moving the platen carrier 16 in the same direction and at the same speed as the printing cylinder. Also diagrammatically illustrated at 318 in Fig. 11 is the solenoid 74 (Figs. 2 and 4) or the solenoid 234 (Fig. 10), for moving the platen and the print receiving surface thereon into printing engagement with the periphery of the cylinder. The solenoid 316 as shown in Fig. 11 is arranged in circuit parallel relation with a capacitance 320.

A high voltage supply line 322 supplies current for operating the two solenoids 316 and 318. The platen carrier 16 is shown at its initial starting position and in this position, if the circuits of Fig. 11 are traced, the contact members 304 and 306 of the two switch devices are so closed as to deliver current from the high voltage supply to the two solenoids. Contact member 302 is in its lower position closing the circuit from the supply line to line 328. Contact member 304 is in its lower position closing the line 328 with the line 330 leading to the carrier moving solenoid 316 and thence by way of line 326 to a thyratron plate or other electrical control device in the electronic control unit. The print solenoid 318 is connected by line 334 to the carrier actuating solenoid circuit 332 at one end but the opposite end is normally open at the initial starting position of the carrier 16 as shown by the position of the contact member 304 in the micro-switch 300. A counter reset circuit line 324 leads from mechanism in the control unit 24 for resetting the electronic pulse counter. The opposite end of the last mentioned line 324 enters the micro-switch 302 but in the initial starting position of the carrier 16 is open as shown by the position of the contact member 306 in Fig. 11.

When a thyratron tube in the electronic control unit 24 is fired, which occurs when the electronic pick-up element 100 has counted up to the number of the selected item to be printed, the circuit is closed from the supply line 322 through the lines 328, 330 and 326, energizing the solenoid 316 and causing the platen carrier 16 to move with the printing cylinder. As previously described, this action occurs as the selected line of type on the printing cylinder is passing by the platen. Resulting from the action of the solenoid 316, the platen carrier 16 is moved in the direction of the arrow in Fig. 11 and very soon after leaving its initial starting position it assumes the speed of the printing cylinder. After the carrier leaves its initial starting position, the raised land 312 thereon first engages the operating arm 308 and causes the arm to lift the contact member 304 opening the circuit for the solenoid 316 and closing the circuit 334 for the print solenoid 318. The capacitance 320, however, acts to retain the solenoid 316 in energized condition for a short interval of time following the opening of the solenoid circuit by the lifting movement of the contact member 304. Upon energization of the print solenoid 318, the platen advances toward the periphery of the cylinder and brings the print receiving surface into line contact with the selected line of type on the cylinder.

Upon further travel of the platen carrier 16 with the cylinder, the raised land 312 thereon engages the second operating arm 310 causing the latter to lift the contact member 306. The upward movement of the latter breaks the circuit supplying current to the print solenoid 318, de-energizing the same, and connects the power supply line into the counter reset circuit 324. Upon de-energization of the light solenoid, the platen and the print receiving member thereon are forced away from the periphery of the cylinder by the yielding means against which the solenoid acted. The closing of the counter reset circuit 324 causes the electronic pulse counters to be reset for the next printing operation. Following de-energization of both solenoids 316 and 318 the platen carrier 16 is free to return to its initial starting position by the action of the springs 66 (Fig. 4) and 232 (Fig. 10).

*Summary*

There has been provided as a result of this invention an improved method of and apparatus for rapidly and conveniently printing a multiplicity of different items and for registering and recording quantitative fluctuations applying to the different items printed. The invention is herein illustrated and described as embodying a machine for invoicing and inventorying stock which is rapid and automatic in operation, supplies a running or current inventory of all stock on hand, and is conveniently operated by one operator.

The separate parts of the machine for supporting the print receiving surface and the printing type are so related in size and shape that when a printing impression is made by bringing the parts together a single line of type is printed on the receiving surface. The parts are movable relative to one another and following the manual selection of the desired item to be printed, the parts are self-operable to print the desired line without further control thereover by the operator. In the application of the invention to a billing and inventorying apparatus, the quantity of the item of merchandise ordered as well as the item itself are printed together in aligned relation on an invoice blank and the change in stock resulting from the invoicing of the item is immediately and automatically reflected on a readily observable form of register. The latter may be located remote from the billing machine and at periodic intervals a permanent record of the inventory displayed by the register may be made such as by use of the camera hereinabove described. For use in smaller merchandise establishments the single cylinder embodiment of the invention may be utilized. For larger commercial establishments a multi-cylinder form of the invention may be utilized.

It is understood that the embodiments of the invention herein shown and described are to be taken as preferred examples of the same; and that various changes in the shape, size, arrangement and operative relation of the parts may be resorted to without departing from the spirit of the invention or the scope of the appended claims.

What I claim is:

1. In the art of printing, the method of printing a single line of type at a time which comprises rotating a printing cylinder having on the periphery thereof a plurality of different lines of type extending parallel to the axis of rotation and circularly spaced from one another around the cylinder, disposing a flexible print receiving surface adjacent to the periphery of the cylinder so that the lines of type successively pass thereby, curving the print receiving surface for line contact with a selected line of type on the cylinder, bringing the curved print receiving surface into line contact with the selected line of type on the cylinder as it passes thereby moving the print receiving surface in a curved path having its axis coinciding with the axis of rotation of the cylinder and at the same speed as the periphery thereof, and thereafter disengaging the curved print receiving surface from the selected line of type with the printed impression received thereon.

2. In the art of printing, the method which comprises rotating a cylinder having on the periphery thereof a plurality of different lines of type extending parallel to the axis of rotation of the cylinder and circularly spaced from one another therearound, disposing a flexible print receiving surface adjacent to the rotating periphery of the cylinder so that the lines of type thereon successively pass thereby, curving the print receiving surface for line contact with a single selected line of type on the cylinder, predeterminedly selecting a line of type on the cylinder for printing engagement with the print receiving surface, bringing the curved print receiving surface into momentary line contact with the selected line of type on the cylinder as it passes thereby, and moving the print receiving surface in a curved path around the center of the printing cylinder and at the same speed as the periphery thereof during the printing operation.

3. In the art of printing, the method which comprises rotating a printing cylinder having on the periphery thereof a plurality of different lines of type extending parallel to the axis of rotation of the cylinder and circularly spaced apart from one another, disposing a flexible print receiving member adjacent to the rotating periphery of the cylinder so that the lines of type thereon successively pass thereby, curving the member to form a convex print receiving surface of such a radial dimension that it will receive the printing impression of a single line of type on the cylinder, predeterminedly selecting a line of type on the cylinder for printing on the convex surface of the member, advancing the convex surface of the member radially of the cylinder into line contact with the selected line of type on the cylinder as it passes thereby, and momentarily moving the convex surface of the member while in contact with the selected line of type around the axis of the cylinder and at the peripheral speed thereof until the printing impression of the line of type has been transferred to the print receiving surface of the member.

4. In the art of printing, the method of printing a single line of type upon a print receiving surface which comprises continuously rotating a printing cylinder, bringing a print receiving surface into contact with a single line of type on the printing cylinder at a predetermined point in the cylinder's rotation, moving the print receiving surface while in printing engagement with the line of type with which it is brought into contact around the center of the printing cylinder and at the same speed as the periphery of the cylinder, and disengaging the print receiving surface from contact with the cylinder after the latter has rotated to another point of its rotation.

5. In the art of printing, the method of printing a single line of type upon a print receiving surface which comprises continuously rotating a printing cylinder bearing on its periphery a plurality of different lines of type, bringing a print receiving surface into contact with a single selected line of type on the cylinder at a predetermined point in its rotation, moving the print receiving surface together with the periphery of the cylinder while in engagement with the selected line of type and while the cylinder continues to rotate, and disengaging the print receiving surface from contact with the selected line of type after the cylinder has rotated an angular distance from said predetermined point.

6. In the art of printing, the method of printing which comprises continuously rotating a printing cylinder having on the periphery thereof a plurality of circularly spaced rows of different printing type, feeding a print receiving surface in a path adjacent to the periphery of the cylinder, bending the print receiving surface for line contact with the periphery of the cylinder, bringing the bent print receiving surface into contact with a single selected row of printing type on the cylinder and moving the print receiving surface while so contacting the selected row of type on an arc whose center of curvature corresponds to that of the printing cylinder and at the same speed as the periphery of the cylinder.

7. In the art of printing, the method of printing which comprises continuously rotating a printing cylinder, bringing a print receiving surface into contact with a portion of the periphery of the cylinder, causing the print receiving surface following such contact to travel around the axis of the cylinder while in printing engagement with the periphery thereof and at the same rate of speed as the periphery of the cylinder, and disengaging the print receiving surface from the periphery of the cylinder after the latter has rotated an angular distance from the point of contact of the print receiving surface therewith.

8. In the art of printing a single line of type at a time which comprises continuously rotating a printing cylinder having on the periphery thereof a plurality of rows of different printing types extending parallel to the axis of rotation and circularly spaced apart from one another, disposing a flexible print receiving surface adjacent to the periphery of the printing cylinder so that the rows of type successively pass thereby, curving a portion of the print receiving surface for line contact with any selected row of type on the printing cylinder, bringing the curved portion of the print receiving surface into contact with a selected row of type on the cylinder at a predetermined point in its rotation, causing the curved contacting portion of the print receiving surface to travel in the same direction as the cylinder and around the axis thereof and at the same rate of speed as the periphery of the cylinder while in printing engagement with the selected row of type, and disengaging said curved portion of the print receiving surface from the selected row of type before the cylinder completes one revolution from said predetermined point.

9. In a printing machine, a rotatable cylinder carrying on its periphery a plurality of different lines of printing type arranged in substantially parallel relation to the axis of rotation of the cylinder and in circularly spaced relation therearound, means for imparting rotation to the cylinder, means for supporting a print receiving sheet adjacent to the periphery of the cylinder such that when the cylinder is rotated the lines of type thereon successively pass by the sheet, means for moving the print receiving sheet in a path of movement substantially radially of the cylinder for engaging the sheet with the periphery thereof, means for bending the print receiving sheet such that when engaged with the periphery of the cylinder it presents a surface area sufficient to receive the impression of only a single line of type on the cylinder, means for predeterminedly selecting a line of type on the cylinder and for causing the print receiving sheet to move into engagement with the selected line of type when the latter is passing by the sheet, and means for moving the print receiving sheet while in contact with the selected line of type around the axis of the cylinder and at the peripheral speed thereof to transfer the printed impression of the line of type to the sheet.

10. In a printing machine, a continuously rotating cylinder having on the periphery thereof a plurality of different lines of printing type, means for bringing a print receiving surface into contact with the periphery of the cylinder to receive a printed impression of one line of type thereon, means for selectively determining the line of type with which the print receiving surface is brought into contact to receive the printed impression, and means for moving the print receiving surface while in contact with the selected line of type around the axis of the cylinder and at the same peripheral speed thereof to receive the printed impression of the selected line of type while the cylinder continues to rotate.

11. A printing machine comprising, in combination, a continuously rotating printing cylinder having a plurality of different lines of printing type arranged in circularly spaced relation around the periphery thereof, means for feeding a flexible print receiving surface adjacent to the periphery of the cylinder, means for bending a portion of the print receiving surface for line contact with the periphery of the cylinder, means for advancing the bent portion of the print receiving surface radially into engagement with the periphery of the cylinder to receive a printed impression of one of the lines of type thereon, means for moving said bent portion of the print receiving surface while thus engaged together with the periphery of the cylinder and partially around the axis of the cylinder while the cylinder rotates a predetermined angular distance about its axis of rotation, means for selecting the line of type on the cylinder with which the print receiving surface is to be brought into contact and for controlling the operation of said advancing means to effect contact of the bent portion of the print receiving surface with the selected line of type, and means for retracting said surface from the periphery of the cylinder after the same has rotated said angular distance of travel.

12. A billing machine comprising, in combination, a rotatable cylinder having on the periphery thereof a plurality of different lines of type arranged in circularly spaced relation therearound, means for continuously rotating the cylinder, means for supporting an invoice blank adjacent to the periphery of the cylinder, means for bringing a portion of the invoice blank into contact with the periphery of the cylinder to receive the printed impression of one line of type thereon, control means for selectively determining the line of type on the cylinder with which the portion of the invoice blank is to be brought into contact to receive the printed impression thereof and for causing said portion of the invoice blank to engage the selected line of type as the latter passes by the invoice blank, and means for momentarily coupling the invoice blank supporting means to the cylinder for joint movement with the periphery thereof to effect transfer of the printing impression to the selected line of type onto the invoice blank.

13. A billing machine comprising, in combination, a rotatable cylinder having on its periphery a plurality of lines of type circularly spaced therearound and representative of different items of merchandise, means for continuously rotating the cylinder, means for supporting a flexible print receiving member containing an invoice blank adjacent to the periphery of the cylinder and for moving the member into engagement with the periphery of the cylinder, means for bending said member such that when engaged with the periphery of the cylinder it presents a surface area sufficient to receive the impression of a single line of type thereon, control means for causing the member to move into engagement with a selected line of type on the cylinder as the latter passing by the invoice blank supporting means, and means for moving the invoice blank supporting means in the same direction and at the same speed of the periphery of the cylinder while so engaged therewith to complete the transfer of the printing impression of the selected line of type onto the invoice blank.

14. A billing machine comprising, in combination, a rotatable drum having on its periphery a plurality of circularly spaced lines of printing type each representative of a different item of merchandise, an elongated flexible print receiving member containing a successive series of partially printed invoice blanks, means for supporting an invoice blank on the member adjacent to the periphery of the drum such that as the drum rotates the lines of type successively sweep past the invoice blank, means providing movement of said supported invoice blank radially of the cylinder and into engagement with the periphery thereof and further providing movement of the supported invoice blank on an arc of curvature having its axis coinciding with the axis of rotation of the cylinder, means for bending said supported invoice blank so that it presents a surface area sufficient to receive the printed impression of only one line of type on the cylinder, control means for predeterminedly selecting a line of type on the cylinder for printed engagement with said supported invoice blank, and operating means responsive to said control means for moving the supported invoice blank into engagement with the selected line of type as it sweeps past the invoice blank and for moving the supported invoice blank along said arc of curvature at the same speed as the periphery of the cylinder and while so engaged with the selected line of type thereon.

15. A printing machine comprising, in combination, a rotatable drum having on its periphery a plurality of different lines of type arranged parallel to the axis of rotation of the drum and circularly spaced therearound, means for rotating said cylinder, means for supporting a print receiving surface adjacent to the periphery of the drum such that when the drum is rotated the different lines of type thereon successively sweep past the print receiving surface, means for moving the print receiving surface into engagement with the periphery of the drum to receive the printed impression of a single line of type thereon, control means including a plurality of actuatable elements adapted to select any one of a plurality of consecutive numbers, means responsive to the number selected by the elements of the control means for counting the lines of type on the cylinder from a predetermined zero reference, and means for actuating said moving means to engage the print receiving surface with the line of type on the cylinder corresponding in number to that selected by said control means.

16. A printing machine comprising, in combination, a rotatable drum having on its periphery a plurality of different lines of type arranged parallel to the axis of rotation of the drum and circularly spaced therearound, means for rotating the drum, means for supporting a print receiving surface adjacent to the periphery of the drum such that when the drum is rotated the lines of type thereon successively sweep past the print receiving surface, means for moving the print receiving surface into line contact with the periphery of the drum to receive the printed impression of a single line of type thereon, and electronic means for controlling said moving means so as to bring the print receiving surface into contact with a selected line of type as the latter is sweeping by the print receiving surface, said last means including a plurality of actuatable switch elements for selecting any one of a plurality of consecutive members and electronic means for counting the number of lines of type on the cylinder from a zero reference, and means responsive to the number selected by said switch elements for rendering said moving means operative to move the print receiving surface into engagement with the periphery of the drum when the number of the line of type corresponding to that selected is sweeping by the print receiving surface.

17. A billing machine comprising, in combination, a rotatable drum carrying on its periphery a plurality of circularly spaced apart lines of type each representative of a different item of merchandise, means for rotating the drum, means for supporting an invoice blank adjacent to the periphery of the drum and for moving the invoice blank into line contact with the periphery of the drum for receiving the printed impression of a single line of type thereon, a plurality of elements carried by the drum corresponding in number and position to the lines of type thereon, a control unit separate from the drum and containing a plurality of manually actuatable buttons adapted upon actuation to select any one of a series of numbers equal to the number of any one of said elements as counted from a zero reference, an electronic counter including an electronic pick-up member positioned adjacent to said elements for counting the same from said zero reference as they sweep thereby, switch means electrically associated with said buttons and with said electronic counter and adapted upon the selection of a number by the buttons to preset the electronic counter for operation, and means electrically connecting said electronic counter with said invoice blank moving means and rendering the latter operative to move the invoice blank into contact with the periphery of the drum when the number of elements counted by the electronic counter corresponds to the number selected by the buttons of the control unit.

18. A printing machine comprising, in combination, a series of coaxially related rotatable printing cylinders each having on the periphery thereof a plurality of different lines of type arranged parallel to the axis of rotation of the cylinder and circularly spaced therearound, means for rotating said cylinders, means for supporting a print receiving surface and for shifting the same parallel to the axis of rotation of the cylinders and adjacent to their peripheries, means for moving the print receiving surface into line contact with the periphery of the cylinder opposite which it is disposed to receive the printed impression of a single line of type thereon, means for controlling the shifting movement of said supporting means to dispose the same opposite any one of said cylinders, and means for controlling said moving means to cause the print receiving surface to contact the periphery of the cylinder opposite which it is shifted.

19. A printing machine comprising, in combination, a series of coaxially related rotatable printing cylinders each having on its periphery a plurality of different lines of type arranged parallel to the axis of rotation of the cylinder and circularly spaced therearound, means for simultaneously rotating said cylinders at the same rate of speed and in the same direction, a track extending the length of said cylinder series and parallel to the axis of rotation thereof, a body movable along said track, means for moving said body along the track, a platen carried by said body and shaped to curve a print receiving surface for line contact with the periphery of the cylinder opposite which it is disposed, means supporting the platen on the body for movement into engagement with the periphery of the cylinder opposite which it is disposed, and means for controlling the movement of said body along the track to position the platen opposite any one of the cylinders and for controlling the movement of the platen to bring the print receiving surface into line contact with a selected line of type on the cylinder.

HANLEY W. WOLF.

REFERENCES CITED

The following references are of record in the file of this patent:

UNITED STATES PATENTS

| Number | Name | Date |
| --- | --- | --- |
| 542,358 | Carter | July 9, 1895 |
| 963,340 | Walters | July 5, 1910 |
| 1,643,608 | Priestly | Sept. 27, 1927 |
| 1,675,969 | Bull | July 3, 1928 |
| 1,935,799 | Jamison | Nov. 21, 1933 |
| 1,971,860 | Knutsen et al. | Aug. 28, 1934 |
| 1,977,453 | Petit et al. | Oct. 16, 1934 |
| 2,038,302 | Longoria | Apr. 21, 1936 |
| 2,181,166 | Austin | Nov. 28, 1939 |
| 2,232,424 | Baker et al. | Feb. 18, 1941 |
| 2,250,534 | Higgins et al. | July 29, 1941 |
| 2,270,898 | Robinson | Jan. 27, 1942 |
| 2,412,472 | Ryan et al. | Dec. 10, 1946 |